(No Model.) 2 Sheets—Sheet 1.
M. C. MEIGS.
EXCAVATOR.
No. 491,577. Patented Feb. 14, 1893.
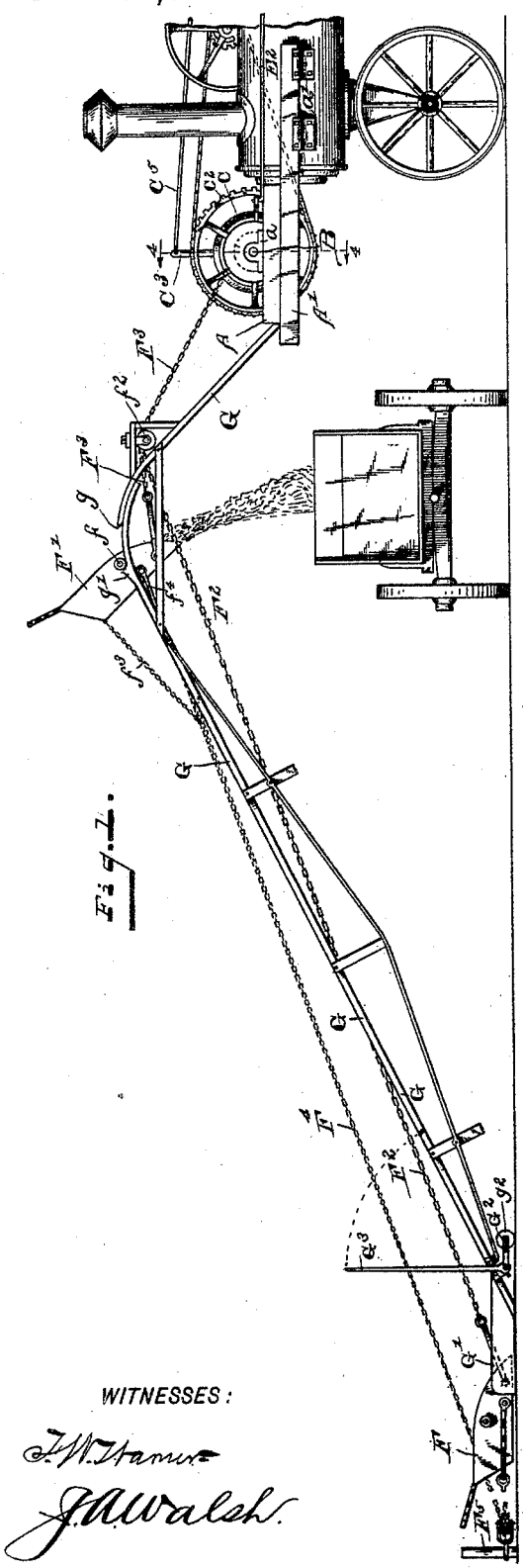
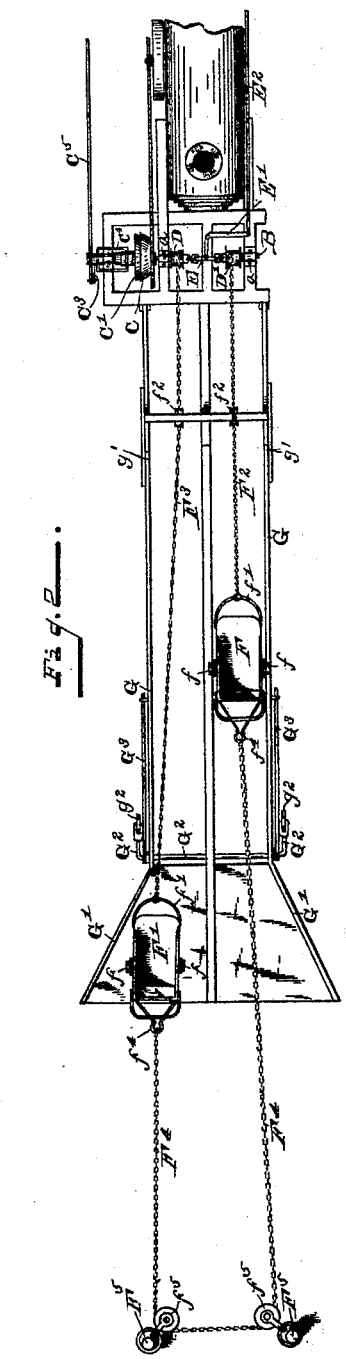
WITNESSES:
INVENTOR
Montgomery C. Meigs,
per
ATTORNEYS.

(No Model.) 2 Sheets—Sheet 2.

M. C. MEIGS.
EXCAVATOR.

No. 491,577. Patented Feb. 14, 1893.

WITNESSES:
F. W. Warner.
J. A. Walsh.

INVENTOR
Montgomery C. Meigs,
per C. & E. W. Bradford,
ATTORNEYS.

THE NORRIS PETERS CO., PHOTO-LITHO., WASHINGTON, D. C.

UNITED STATES PATENT OFFICE.

MONTGOMERY C. MEIGS, OF LAFAYETTE, INDIANA.

EXCAVATOR.

SPECIFICATION forming part of Letters Patent No. 491,577, dated February 14, 1893.

Application filed February 9, 1892. Serial No. 420,824. (No model.)

*To all whom it may concern:*

Be it known that I, MONTGOMERY C. MEIGS, a citizen of the United States, residing at Lafayette, in the county of Tippecanoe and State of Indiana, have invented certain new and useful Improvements in Excavators, of which the following is a specification.

The object of my said invention is to produce an apparatus whereby earth may be easily and expeditiously excavated, and carried to an elevation, or a different location, whence it may be dumped into a vehicle, or heap, as may be desired, by power.

Said invention will first be fully described, and then pointed out in the claims.

Figure 3:
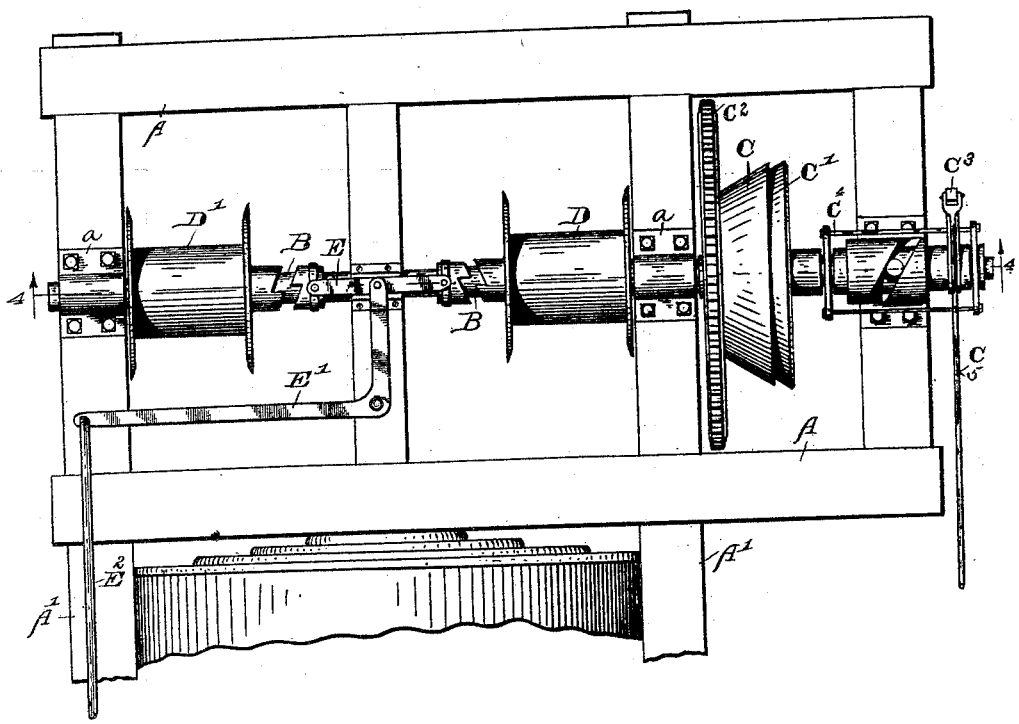
Figure 4:
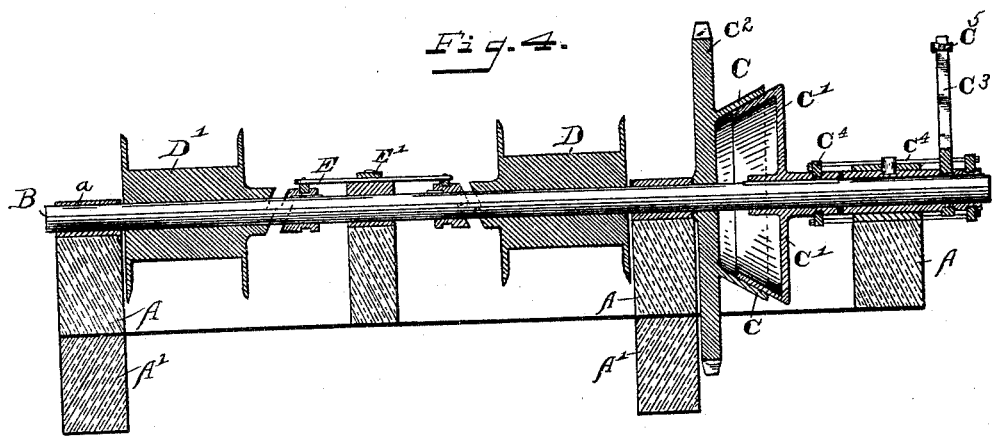

Referring to the accompanying drawings, which are made a part hereof, and on which similar letters of reference indicate similar parts, Figure 1 is a side elevation of an apparatus embodying my invention, in position ready for use, and attached to a steam engine; Fig. 2 a top or plan view of the same on a smaller scale; Fig. 3 a top or plan view of the driving shaft, clutch mechanism, &c., on an enlarged scale, and Fig. 4 a vertical sectional view as seen when looking in the direction indicated by the arrows from the dotted lines 4 4 in Figs. 1 and 3.

In said drawings the portions marked A represent the frame-work carrying the driving mechanism, and which is attached (in the arrangement shown in the drawings) to the front end of a farm engine; B the driving shaft; C C' the two parts of a friction clutch by which said shaft is driven; D D' two spools loosely mounted upon said shaft; E a reversible clutch arranged between said spools and adapted to engage with either; F F' scrapers or conveyers connected to said spools and adapted to convey the earth from where it is taken up to where it is to be deposited, and G the frame-work constituting the tracks for said scrapers or conveyers.

As heretofore stated, I intend that my excavator shall be operated by power, and it is convenient and desirable that it shall be adapted to be operated from a farm or portable engine, as such engines are commonly easily procured at or near where the work to be done by my machine is usually required to be performed.

The frame A is shown as mounted upon projecting timbers A', which are secured by brackets $a'$ to the sides of such an engine. Upon this frame-work are the bearings $a$ for the shaft B, and such other bearings and attachments as the character of the mechanism requires.

The shaft B is mounted in the bearings $a$ on the frame A, and carries the various spools and clutches which go to make up the operating mechanism of my device, as will be presently described.

The clutch part C is mounted and adapted to revolve loosely upon the shaft B. Formed integrally therewith, or attached firmly thereto, is the sprocket wheel, or pulley, $C^2$, which is driven by a chain or other belt from a shaft on the engine. In operation, therefore, this half of the friction clutch continually revolves. The part C' of the friction clutch is adapted to move longitudinally of, but not revolve upon, the shaft B. When thrown into engagement with the part C, therefore, it is driven by said part C, and drives the shaft. This clutch part is adapted to be operated by the lever $C^3$ through the intermediate mechanism $C^4$ (which may be of an ordinary or any desired character), and a rod $C^5$ runs back from the top of the lever to the rear of the engine, near where the engineer stands, so that he may conveniently operate it without moving from his ordinary position.

The two spools D and D' are mounted loosely upon the shaft B, and the chains running to the scrapers or conveyers are connected thereto.

The double clutch E is located between the two spools D and D', and is adapted to move longitudinally of the shaft B, but not to revolve thereon. It is adapted, by means of the bell-crank lever E', to be thrown into engagement with either of the spools, or to be disengaged from both, as in the position shown in the drawings. By manipulating this clutch, therefore, through said bell-crank lever, either of the spools may be caused to revolve with the shaft and wind up its chain, while, when desired, both may be permitted to remain at rest. The rod $E^2$, similar to the rod $C^5$, runs back to the rear of the engine for similar purposes.

The scrapers or conveyers F F' are shown of the form of ordinary scrapers, except that they are provided upon the sides with small stud-shafts carrying small trucks $f$ which are formed preferably like small car wheels, and which are adapted to run upon the tracks G. They are connected to the corresponding spools D and D' by the chains or ropes $F^2$ and $F^3$, which run from bails $f'$ on the scrapers (over sheaves $f^2$ suspended from a point on the frame-work near its highest elevation), to said spools to which the ends of said chains are attached. A smaller chain or rope $F^4$ (see particularly Fig. 2) connects with corresponding bails $f^4$ attached to the rear ends of the scrapers, and runs around sheaves $f^5$, upon standards or posts $F^5$, driven into the ground at the opposite side of the place where the work of excavation is to be done from that where the engine or other source of power is located. Small stay-chains $f^3$ (see Fig. 1) are connected to the scrapers and to the chain $F^4$, and prevent the scrapers from tipping entirely over while being "dumped" or unloaded.

The frame-work G at one end rests upon and is attached to the frame-work A, and at the other end it terminates in a large flaring plate G' which rests upon the ground. It usually extends upwardly from the point where it is attached to the frame A, in order to reach the desired elevation, and from thence it descends in a gradual incline to the ground. It is usually constructed of T-iron, and is trussed, as shown, for strength and rigidity. It consists essentially of two tracks, one for each of the two scrapers or carriers, and at the center a single bar is preferably wide enough to form one rail for both of the two tracks over which the small trucks or wheels on the scrapers or conveyers may not only travel, but pass each other without colliding. At the point $g$ (see Fig. 1) a stop is constructed, beyond which the trucks of the scrapers or conveyers cannot pass, should by any means the application of power be continued too long. The friction clutch composed of the two parts C and C' is arranged to come into contact or engagement with sufficient force to draw the scrapers or conveyers up the incline, but to slip should any obstruction, requiring a considerable increase of power to overcome be encountered. Therefore, should the scraper trucks come in contact with this stop, the clutch would simply slip, and no damage result. A little way to the rear of these stops are projections $g'$ on the tracks. These operate to cause the scrapers to unload when the movement is reversed, and they are permitted to drop back so that their trucks $f$ come against these projections. It will be understood, of course, that the chains are somewhat slack, and so, when the machine is reversed, there is a period, when one scraper is to be pulled from its position farthest away from where it is to be unloaded, that the one which has just been drawn up to that position will not be moved by either of its chains. It then drops back against these projections $g'$, and the natural tendency is for it to "dump" or unload, automatically. In case it does not, however, the chain $F^4$, as will be observed, is attached to a point below the trucks $f$, and so, when it first begins to pull, will tilt the scraper on these trucks, (as on a pivot) and cause it to unload before exerting force enough to draw it over the projections $g'$. The scraper is at this time prevented from being tipped entirely over by the stay-chain $f^3$, as will be readily understood. The large plate G' which forms the terminal part of the frame G is, as shown, made flaring with raised sides. The scraper or conveyer when it reaches this point after having been drawn over the plowed ground, and thus loaded, is guided by the raised side to its correct position on the tracks. The posts or standards $F^5$ are driven somewhat farther apart than the distance between the centers of the tracks, and thus the tendency is to keep the scrapers away from each other during their movement over the rough or plowed ground, while, when they are brought onto the track, the flaring plate G' operates to bring them to correct position, as just described.

In order that this machine may be more easily transported from place to place, I have provided a shaft $G^2$ with bent ends which carry caster-wheels $g^2$. Levers $G^3$ are fixedly attached to this shaft, and extend upwardly (as shown in Fig. 1) when the machine is in position for use. When it is desired to transport the machine to another place, these levers are forced down, which, as will be readily understood, raises the large plate G' from the ground, and throws the weight of it and of the lower part of the frame G onto the caster-wheels. The ends of the levers being secured to the sides of the frame G, the machine is ready to be transported to another place.

Having thus fully described my said invention, what I claim as new, and desire to secure by Letters Patent, is—

1. The combination, in an excavator, of the engine or motor by which the excavating mechanism is driven, an arched frame-work one end of which rests upon the ground and the other is supported on said motor, and said excavating mechanism, said structure as a whole being thus easily removed from place to place, substantially as set forth.

2. The combination, with a scraper or conveyer of an excavator, and the chains or ropes by which it is operated back and forth, of a stay-chain $f^3$ connected to the rear of the scraper and to the chain by which it is drawn back, whereby, when the scraper or conveyer is dumped or unloaded, it is prevented from being turned entirely over, substantially as set forth.

3. In a device for excavating and elevating, tracks G having stops $g$ and projections $g'$, and scrapers and conveyers having trucks running upon said tracks, and chains connected to mechanism by which said scrapers or conveyers are moved from one point to the other and automatically unloaded at the terminal point, substantially as set forth.

4. In a device for excavating and elevating, the combination of tracks having upward projections thereon over which the bearings on the conveyers will run, said conveyers, and chains connected thereto whereby the conveyers are dumped upon the beginning of the return thereof after being raised to the highest point, substantially as set forth.

5. The combination, in an excavator, of a power mechanism or motor, a frame-work one end of which is mounted thereon and the other end of which rests upon the ground, trucks mounted on a crank-shaft at said other end, and a lever also attached to said crank-shaft, whereby the same may be raised from contact with the ground and the whole structure thus supported upon wheels for transportation, substantially as shown and described.

In witness whereof I have hereunto set my hand and seal, at Indianapolis, Indiana, this 3d day of February, A. D. 1892.

MONTGOMERY C. MEIGS. [L. S.]

Witnesses:
CHESTER BRADFORD,
J. A. WALSH.